United States Patent
Tjahjono et al.

(10) Patent No.: US 9,602,227 B2
(45) Date of Patent: Mar. 21, 2017

(54) DISTRIBUTION OF BROADCAST TRAFFIC THROUGH A MESH NETWORK

(71) Applicants: Danu Tjahjono, Dublin, CA (US); Wenge Ren, Sunnyvale, CA (US); Amalavoyal Narasimha Chari, Menlo Park, CA (US); Balaji Rajavelu, Milpitas, CA (US)

(72) Inventors: Danu Tjahjono, Dublin, CA (US); Wenge Ren, Sunnyvale, CA (US); Amalavoyal Narasimha Chari, Menlo Park, CA (US); Balaji Rajavelu, Milpitas, CA (US)

(73) Assignee: ABB Inc, Cary, NC (US)

( * ) Notice: Subject to any disclaimer, the term of this patent is extended or adjusted under 35 U.S.C. 154(b) by 224 days.

(21) Appl. No.: 14/317,206

(22) Filed: Jun. 27, 2014

(65) Prior Publication Data
US 2015/0200735 A1    Jul. 16, 2015

Related U.S. Application Data

(60) Provisional application No. 61/927,920, filed on Jan. 15, 2014.

(51) Int. Cl.
| | |
|---|---|
| H04H 20/72 | (2008.01) |
| H04W 4/06 | (2009.01) |
| H04W 76/00 | (2009.01) |
| H04L 12/18 | (2006.01) |
| H04W 88/16 | (2009.01) |

(52) U.S. Cl.
CPC .......... *H04H 20/72* (2013.01); *H04L 12/189* (2013.01); *H04W 4/06* (2013.01); *H04W 76/002* (2013.01); *H04W 88/16* (2013.01)

(58) Field of Classification Search
CPC ...... H04W 84/18; H04W 48/08; H04L 45/02; H04L 45/026; H04L 45/16
See application file for complete search history.

(56) References Cited

U.S. PATENT DOCUMENTS

| | | | | |
|---|---|---|---|---|
| 7,706,373 B2* | 4/2010 | Xu | ........................ | H04L 29/125 370/352 |
| 7,949,358 B2* | 5/2011 | Wentink | ................ | H04W 8/005 455/434 |

(Continued)

*Primary Examiner* — Chandrahas Patel
(74) *Attorney, Agent, or Firm* — Brian R. Short

(57) ABSTRACT

Systems, methods and apparatuses for supporting broadcast traffic through a wireless mesh network are disclosed. One method includes obtaining broadcast listening information of a broadcast listening access node, wherein the broadcast listening information includes an identifier of the broadcast listening access node, and a broadcast identifier of the broadcast listening device. The method further includes obtaining broadcast sourcing information of a broadcast sourcing access node, wherein the broadcast sourcing information includes an identifier of the broadcast sourcing access node, and a broadcast identifier of the broadcast sourcing device. The method further includes providing broadcast listening information of the broadcast listening access node to the broadcast sourcing access node upon determining the broadcast identifier of the broadcast sourcing device matches the broadcast identifier of the broadcast listening device.

15 Claims, 5 Drawing Sheets

(56) References Cited

U.S. PATENT DOCUMENTS

| | | |
|---|---|---|
| 8,879,563 B2 * | 11/2014 | Wakumoto ............ H04L 45/306 370/395.32 |
| 9,247,397 B2 | 1/2016 | Tjahjono et al. |
| 9,247,417 B2 | 1/2016 | Tjahjono et al. |
| 2007/0140241 A1 | 6/2007 | Asbun |
| 2008/0181161 A1 | 7/2008 | Gikim et al. |
| 2009/0201844 A1 | 8/2009 | Bhatti et al. |
| 2012/0207159 A1 | 8/2012 | Buchko et al. |

* cited by examiner

Obtaining, by a gateway of the wireless mesh network, broadcast listening information of one or more broadcast listening access nodes, wherein the broadcast listening access nodes are downstream from the gateway, and the broadcast listening access nodes include a link to a broadcast listening device, and wherein the broadcast listening information includes an identifier of the one or more broadcast listening access nodes, and a broadcast identifier of the broadcast listening device

410

Obtaining, by the gateway, broadcast sourcing information of one or more broadcast sourcing access nodes, wherein the broadcast sourcing access nodes are downstream from the gateway, and the broadcast sourcing access nodes include a link to a broadcast sourcing device, and wherein the broadcast sourcing information includes an identifier of the one or more broadcast sourcing access nodes, and a broadcast identifier of the broadcast sourcing device

420

Providing, by the gateway, broadcast listening information of the one or more broadcast listening access nodes to the one or more broadcast sourcing access nodes that have a broadcast identifier that matches the broadcast identifier of the one or more broadcast listening access nodes

430

FIGURE 4 dinner# DISTRIBUTION OF BROADCAST TRAFFIC THROUGH A MESH NETWORK

RELATED APPLICATIONS

This patent application claims priority to U.S. Provisional Patent Application Ser. No. 61/927,920, filed Jan. 15, 2014 which is herein incorporated by reference.

FIELD OF THE DESCRIBED EMBODIMENTS

The described embodiments relate generally to wireless communications. More particularly, the described embodiments relate to systems, methods and apparatuses for distributing broadcast traffic through a wireless mesh network.

BACKGROUND

In computer networking, broadcast includes the delivery of a message or information to a group of destination computers simultaneously in a single transmission from the source. For an embodiment, broadcast is implemented as an IP broadcast or the layer-2 broadcast which may include non-IP frames. However, presently, layer 3 (IP based) mesh networks cannot send layer 2 broadcast frames natively and reliably.

In order for broadcast to operate properly in a wireless mesh network, routers within the wireless mesh network need to know whether any client devices connected to the wireless mesh network are a member of a broadcast group.

It is desirable to have methods, systems and apparatuses for implementing a wireless mesh network that facilitates distribution of broadcasting traffic through the wireless mesh network.

SUMMARY

An embodiment includes a wireless mesh network gateway. The gateway includes one or more transceivers for communicating with other devices of a wireless mesh network, and a processor. The processor is operative to obtain broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device. The processor is further operative to obtain broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device. The processor is further operative to provide the broadcast listening information of the broadcast listening access node to the broadcast sourcing access node upon determining the broadcast identifier of the broadcast sourcing device matches the broadcast identifier of the broadcast listening device.

An embodiment includes a wireless mesh network. The wireless mesh network includes a first gateway and second gateway. The first gateway is operative to obtain broadcast listening information of a broadcast listening access node, wherein the broadcast listening access node is downstream from the first gateway, and the broadcast listening access node is connected to a broadcast listening device, and wherein the broadcast listening information includes an identifier of the broadcast listening access node, and a broadcast identifier of the broadcast listening device, and exchange the broadcast listening information and the broadcast sourcing information with a second gateway within the wireless mesh network. The second gateway is operative to obtain broadcast sourcing information of a broadcast sourcing access node, wherein the broadcast sourcing access node is downstream from the second gateway, and the broadcast sourcing access node is connected a broadcast sourcing device, and wherein the broadcast sourcing information includes an identifier of the broadcast sourcing access node, and a broadcast identifier the broadcast sourcing device, and provide broadcast listening information of the broadcast listening access node to the broadcast sourcing access node upon determining the broadcast identifier of the broadcast sourcing device matches the broadcast identifier of the broadcast listening device.

An embodiment includes a method of supporting broadcast traffic through a wireless mesh network. The method includes obtaining, by a gateway of the wireless mesh network, broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device. The method further includes obtaining, by the gateway, broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device. The method further includes providing, by the gateway, broadcast listening information of the broadcast listening access node to the broadcast sourcing access node upon determining the broadcast identifier of the broadcast sourcing device matches the broadcast identifier of the broadcast listening device.

An embodiment includes another method of supporting broadcast traffic through a wireless mesh network. The method includes obtaining, by a first gateway of the wireless mesh network, broadcast listening information of a broadcast listening access node, wherein the broadcast listening access node is downstream from the first gateway, and the broadcast listening access node is connected to a broadcast listening device, and wherein the broadcast listening information includes an identifier of the broadcast listening access node, and a broadcast identifier of the broadcast listening device, and the first gateway exchanging the broadcast listening information and the broadcast sourcing information with a second gateway within the wireless mesh network. The method further includes obtaining, by the second gateway, broadcast sourcing information of a broadcast sourcing access node, wherein the broadcast sourcing access node is downstream from the second gateway, and the broadcast sourcing access node is connected a broadcast sourcing device, and wherein the broadcast sourcing information includes an identifier of the broadcast sourcing access node, and a broadcast identifier the broadcast sourcing device. The method further includes providing, by the second gateway, broadcast listening information of the broadcast listening access node to the broadcast sourcing access node upon determining the broadcast identifier of the broadcast sourcing device matches the broadcast identifier of the broadcast listening device.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 4 is a flow chart that includes steps of a method of distributing broadcast traffic through a wireless mesh network, according to an embodiment.

DETAILED DESCRIPTION

The embodiments described provide systems, methods and apparatuses for distributing broadcast traffic through a wireless mesh network.

It is to be understood that while the following descriptions may be focused on broadcast traffic, the described embodiments can be applied generally to multicast traffic. Broadcast is a term used to describe communication where a piece of information is sent from one point to all other points that are within the same Layer 2 domain, or broadcast domain. In this case there is just one sender, but the information is sent to all connected receivers that are within the broadcast domain. Multicast is a term used to describe communication where a piece of information is sent from one or more points to a set of other points. In this case there may be one or more senders, and the information is distributed to a set of receivers, where the set of multicast receivers may be empty or may contain multiple receivers.

Further, while the following described embodiments are presented as wireless mesh networks, the described embodiments can be applied to wired mesh networks as well.

Broadcast transmissions typically only reach recipients that are within a same Layer 2 domain (for example, connected together through a hub or within the same wireless broadcast neighborhood). Broadcast transmissions typically do not propagate through Layer 3 routers, which isolate broadcast domains from each other. By contrast, IP-based multicast allows the multiple recipients to be located in different broadcast domains, so long as they're reachable via IP transmissions and so long as the intermediate routers support IP multicast.

Figure 1:
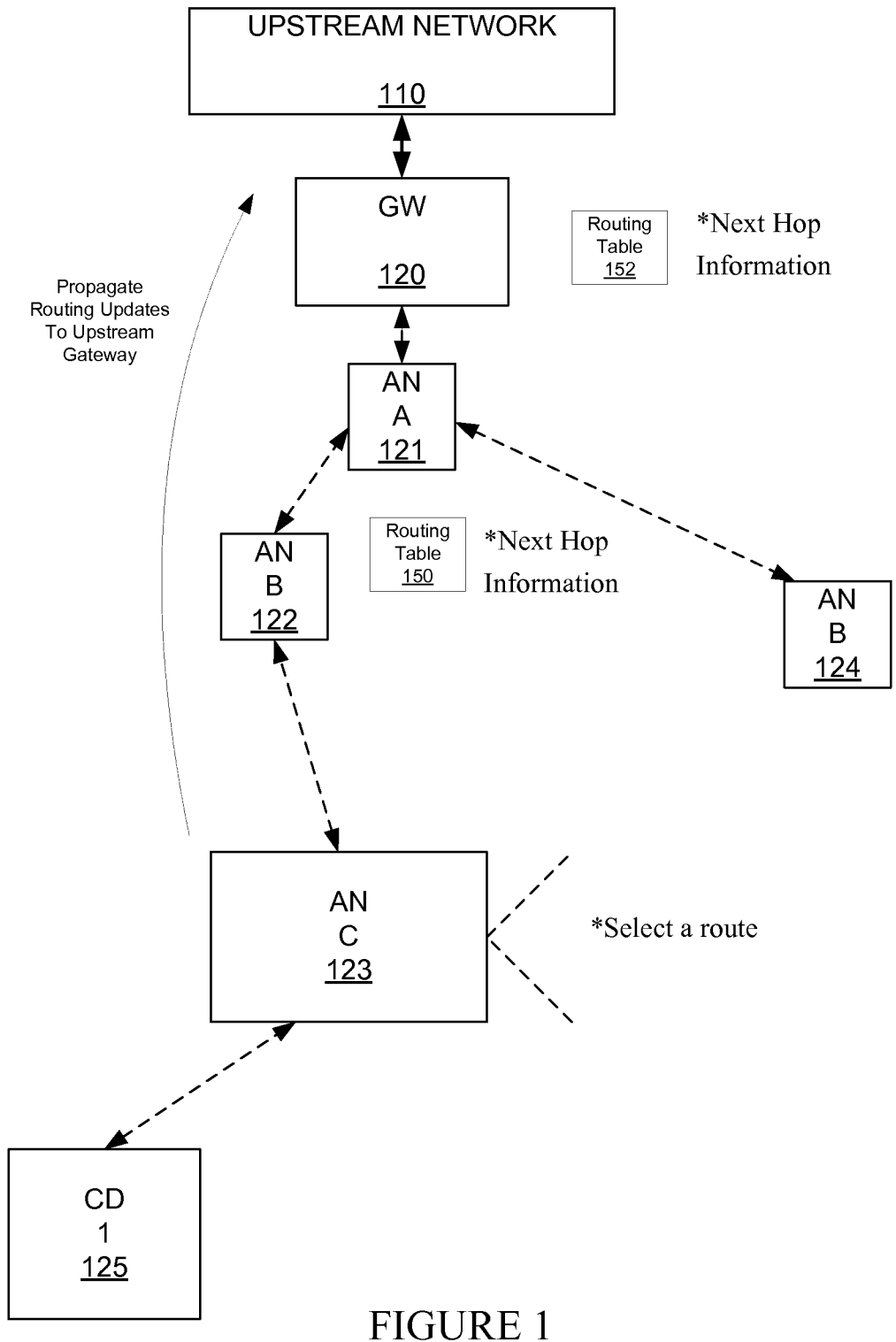
FIG. 1 shows a wireless network that includes a gateway, multiple access nodes and a client device, according to an embodiment.

FIG. 1 shows a wireless network that includes a gateway 120, multiple access nodes 121, 122, 123, 124 and a client device 125. As shown, a gateway 120 is interfaced with an upstream network 110. The gateway 120 typically includes a high-bandwidth connection to the upstream network 110 which can be wired or wireless. Further, the upstream network 110 can include wired and wireless links. For an embodiment, the gateway 120 is an access node that originates routing beacons.

For at least some embodiments, each of the access nodes 121, 122, 123, 124 selects a routing path to the gateway 120. Through the routing path(s), the access nodes 121, 122, 123, 124 are coupled either directly or indirectly to the gateway 120. That is, each access node is either directly connected to the upstream gateway 120, or indirectly connected through another access node to the upstream gateway 120. Many factors can be included in the decision of which access nodes or gateways each access node is connected. Clearly, the network of FIG. 1 can include any number of additional gateways and/or access nodes.

For an embodiment, the gateway 120 broadcasts routing packets (beacons), which can be used to determine routing between the access nodes 121, 122, 123, 124 and the gateways 120 of the network. For this embodiment, the routing beacons are received by all first-level access nodes (for example, access node 121), which are access nodes that are able to receive gateway transmitted beacons, and directly route data through to the gateway 120.

As previously stated, for an embodiment, the beacons are used to establish a route from each access node to the gateway. For an embodiment, the first level access nodes re-broadcast the beacon data, attaching their own information to the routing beacon. The information indicates to the second level access nodes (such as, access nodes 122, 124) that the path to the gateway includes the first level access node. The wireless mesh network can include any number of levels of access nodes.

For an embodiment, each access nodes selects a routing path to an available gateway based on a signal quality of routing beacons received by the access node. For example, an access node may receive routing beacons through one or more routing paths to one or more upstream gateways. For an embodiment, the access node selects that routing path that is determined to be of the highest quality. For an embodiment, the highest quality routing path is the routing path that provides the access node with the highest persistence of receive routing beacons. Once a routing path has been selected, for an embodiment, the access node communicates the selected path up to the gateway of the selected routing path.

Figure 2:
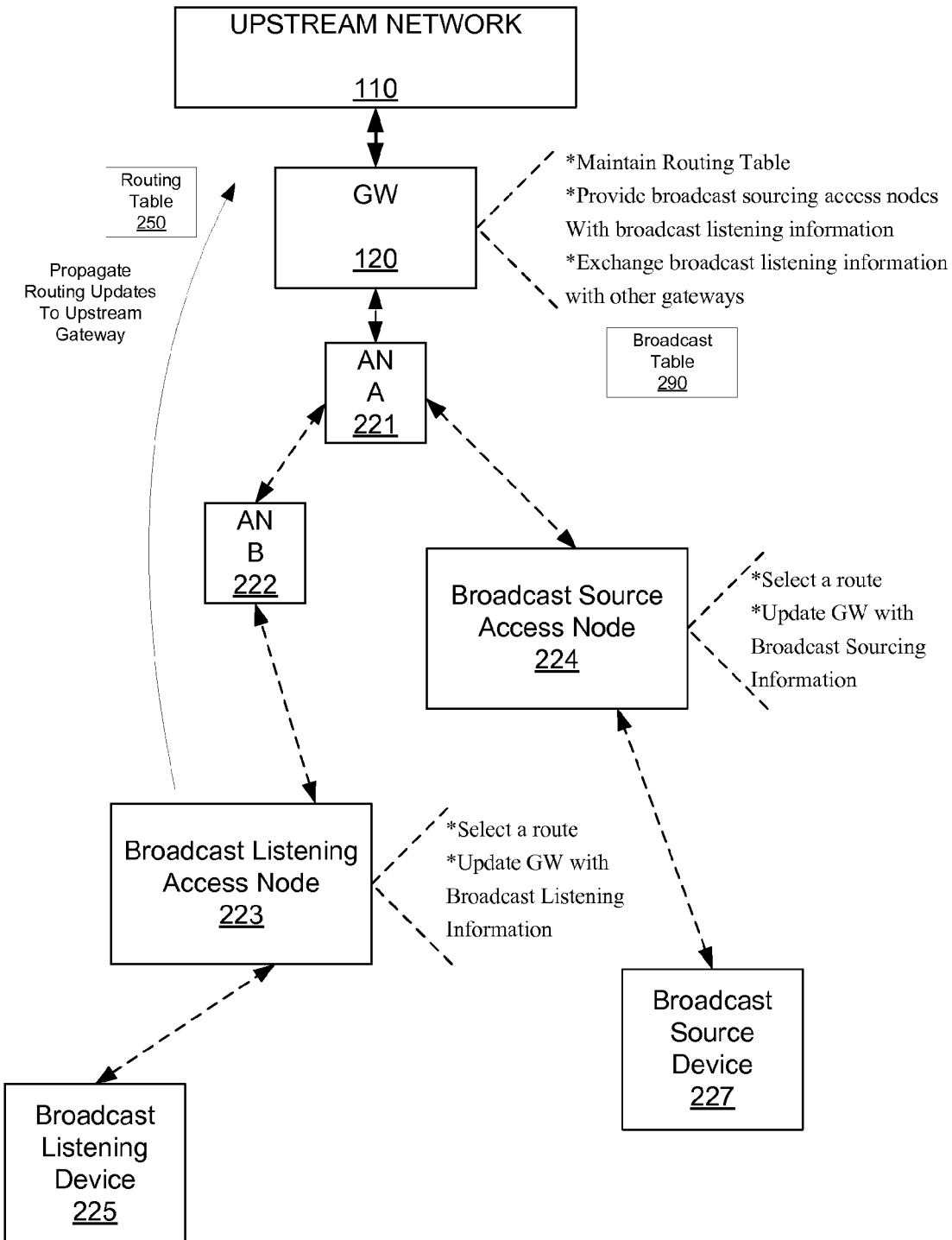
FIG. 2 shows a wireless network that includes a gateway, multiple access nodes and client devices, wherein one of the client devices is a broadcast listening device, and one of the client devices is a broadcast sourcing device, according to an embodiment.

FIG. 2 shows a wireless network that includes a gateway 120, multiple access nodes 221, 222, 223, 224 and a client devices 225, 227, wherein one of the client devices is a broadcast listening device 225, and one of the client devices is a broadcast sourcing device 227, according to an embodiment. As previously described, for an embodiment, each access node communicates its selected routing path up to the gateway of the selected routing path.

For at least some embodiments, the gateway 120 includes one or more transceivers for communicating with other devices (such as access nodes or the upstream network) of a wireless mesh network and a processor. For an embodiment, the processor of the gateway 120 is operative to obtain broadcast listening information of the broadcast listening access node 225, wherein the broadcast listening access node 223 is downstream from the gateway 120. The broadcast listening access node 223 is connected to the broadcast listening device 225, and the broadcast listening information includes an identifier of the broadcast listening access node 223, and a broadcast identifier of the broadcast listening device 225. For an embodiment, the broadcast listening information is obtained by the gateway 120 at the time the gateway 120 receives the routing information from the broadcast listening access node 223.

For at least some embodiments, the gateway 120 is further operative to obtain broadcast sourcing information of the broadcast sourcing access node 224, wherein the broadcast sourcing access node 224 is downstream from the gateway 120, and the broadcast sourcing access node 224 is connected the broadcast sourcing device 227. For at least some embodiments, the broadcast sourcing information includes an identifier of the broadcast sourcing access node 224, and a broadcast identifier of the broadcast sourcing device 227. For an embodiment, the broadcast sourcing information is obtained by the gateway 120 at the time the gateway 120 receives the routing information from the broadcast sourcing access node 224.

For at least some embodiments, the gateway 120 is further operative to provide the broadcast listening information of the broadcast listening access node 223 to the broadcast sourcing access node 224 upon determining the broadcast identifier of the broadcast sourcing device 224 matches the broadcast identifier of the broadcast listening device 223.

While the broadcast listening access node 223 is shown connected to a single broadcast listening device 225, it is to be understood the access node 223 can have any number of broadcast listening devices and any number of broadcast sourcing device connected to it. Further, while the broadcast sourcing access node 224 is shown connected to a single broadcast sourcing device 227, it is to be understood the access node 224 can have any number of broadcast listening devices and any number of broadcast sourcing device connected to it.

Exemplary broadcast sourcing devices include a client device connected to an Ethernet interface of an access node that sends UDP data on a specific port number using broadcast/multicast IP address (255.255.255.255), or multicast IP address (for example, 224.x.y.z), or GOOSE protocol. The client device may also be connected to the wireless interface of access node. For at least some embodiments, encapsulating multicast data in a UDP packet means the broadcast data is sent as the payload of a new IP/UDP packet.

For at least some embodiments, the broadcast sourcing access node 224 receives broadcast packets from the broadcast sourcing device 227 connected to the sourcing access node 224. For at least some embodiments, the sourcing access node 224 encapsulates the broadcast packets into unicast packets, and unicast transmits the unicast packets through the wireless mesh network to the broadcast listening access node 223. For at least some embodiments, the unicast packets include a destination IP address that is an IP address of the broadcast listening access node 223. For at least some embodiments, the unicast packets are unicast transmitted to an IP address of the broadcast listening access node 223. For at least some embodiments, the broadcast listening access node 223 receives the encapsulated packets, de-encapsulates the encapsulated packets, and transmits the de-encapsulated packets to the broadcast listening device 225.

At least some of the described embodiments include sending layer 2 broadcast (for example, unicast packets that include encapsulated the broadcast packets) frames (for example, Ethernet frames) over a layer-3 wireless mesh network. There are many different types of broadcast frames, such as, GOOSE, RNRP, UDP-broadcast, or even serial data sent by client devices. For at least some embodiments, the client device is attached to an AN (Access Node) of the mesh networks. One or more other client devices that are interested in receiving the broadcast frames or traffic are attached to other remote ANs. For at least some embodiments, client devices broadcast a specific frame type to a selective group of client device listeners (broadcast listening device). A broadcast source device is a client device that is broadcasting and a broadcast listening device is a client device that is listening or receives the broadcast. For at least some embodiments, a network operator assigns a unique ID called 'broadcast ID' to refer a specific group of client devices who are broadcasting(sending) and listening(receiving) a specific broadcast frame type. For at least some of the described embodiments, the broadcast ID is the broadcast identifier of the broadcast listening device and/or the broadcast identifier of the broadcast sourcing device. As previously stated, it is to be understood that any AN can have multiple broadcasters (broadcast sourcing devices), listeners (broadcast listening devices) or both broadcasters and listeners. An AN that includes both broadcaster and listener device is a client device that both sends and receives broadcast frames. For at least some embodiments, the client devices are attached to the AN through a wired connection. For at least some embodiments, the client devices are attached to the AN through a wireless connection.

For at least some embodiments, all broadcast listening access nodes and broadcast sourcing access nodes include broadcast sourcing devices and/or broadcast listening devices register with an upstream gateway (within the same cluster) their AN IP addresses and the broadcast-IDs of the listeners and the broadcasters attached to them. The cluster gateway then builds a table (i.e., broadcast table') containing for each broadcast-ID who are the broadcasters and the listeners (that is, the IP addresses of the corresponding ANs).

For example, if the AN 223 has a broadcast listening device 225 with broadcast-ID=5, then the AN 223 registers with the cluster gateway 120 (AN1-IPaddr, listener:5). Further, for example, if the AN 224 has a broadcast sourcing device 227 with broadcast-ID=5, then the AN 224 registers with the same cluster gateway 120 (AN2-IPaddr, broadcaster:5). The cluster gateway 120 than builds a table 290 of (broadcast-ID=5, broadcaster:AN2-IPaddr, listener:AN1-IPaddr). The cluster gateway 120 then notifies the AN 224 that for broadcast-ID=5, the listener: is AN1-IPaddr. When the AN 224 receives the broadcast traffic source associated with broadcast-ID=5, the AN 224 encapsulates the traffic with the unicast UDP packet and send it to the AN 223 directly. For multiple broadcast listener devices, the unicast packet is sent multiple times.

For at least some embodiment, the broadcast source AN 224 encapsulates the broadcast frames from the client devices with unicast IP packets specifically UDP packets with the UDP port number known only in the mesh network. Next, the broadcast source AN 224 sends these UDP packets to all ANs that have broadcast listening devices with the same broadcast ID. Once the UDP packets have arrived at the remote broadcast listening AN 223, the packet is de-encapsulated and the broadcast payload is sent directly to the corresponding broadcast listening client devices. The broadcast source AN 224 obtains updates of all the broadcast listener IP addresses from the cluster gateway 120.

As previously described, for at least some embodiments the broadcast listening access node 223 and the broadcast sourcing access node 224 each select an upstream gateway (shown as gateway 120) based on a routing selection protocol. At least some embodiments further include the broadcast listening access node 223 updating its selected upstream gateway (again, shown as gateway 120) with the broadcast listening information, and the broadcast sourcing access node 224 updating its selected upstream gateway (again, shown as gateway 120) with the broadcast sourcing information.

For at least some embodiments, the identifier of the broadcast listening access node includes an IP address of the broadcast listening access node. For an embodiment, the identifier of the broadcast sourcing access node includes an IP address of the broadcast sourcing access node.

For at least some embodiments, the identifier of the broadcast sourcing access node includes an IP address of the broadcast sourcing access node. For at least some embodiments, the updating is periodic. For at least some embodiments, a roaming listening access node updates a more recently selected upstream device or upstream gateway with its broadcast listening information.

For at least some embodiments, the gateway exchanges the broadcast listening information with other gateways within the wireless mesh network. At least some embodiments further include the sourcing access node receiving broadcast packets from the broadcast sourcing device connected to the sourcing access node, and the sourcing access node encapsulating the broadcast packets into unicast packets, and unicast transmitting the unicast packets through a first gateway of a first cluster and a second gateway of a second cluster of the wireless mesh network to a broadcast listening access node of the second cluster after determining the broadcast identifier of the broadcast sourcing device matches a broadcast identifier of the broadcast listening device of the second cluster.

As described, for at least some embodiments, the gateways only exchange broadcast listening information. That is, for these embodiments the gateways do not exchange broadcast sourcing information. The gateway of a cluster only needs to know the sourcing access node from its cluster, it doesn't care about the sourcing access node from the other clusters since when doing the matching of the broadcast ID of the client devices, it matches the sourcing access node from its cluster against all listening access nodes from all clusters.

For at least some embodiments, an IP address of the listening access node is maintained when the listening access node roams to a different upstream device or a different cluster.

Figure 3:
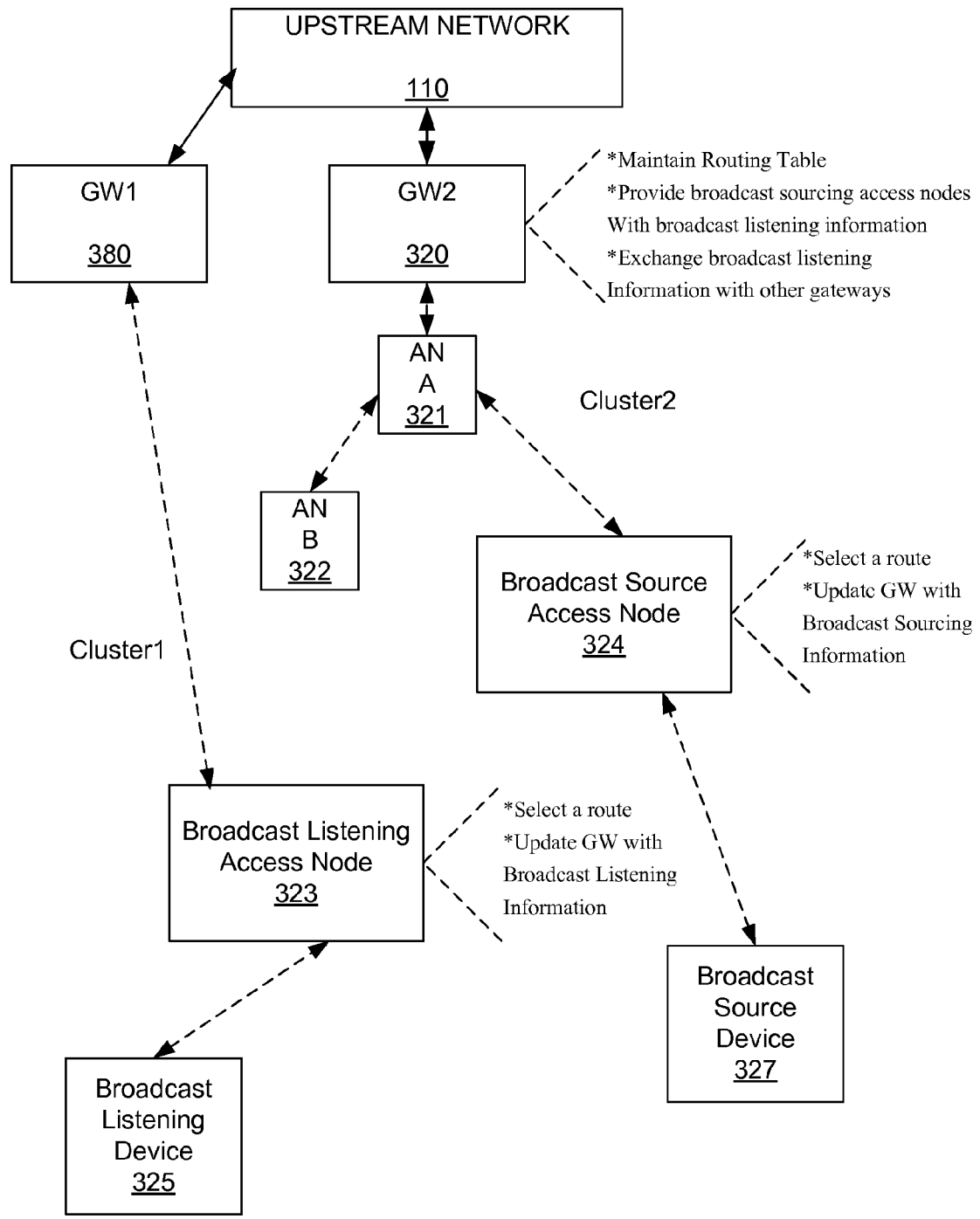
FIG. 3 shows a wireless network that includes multiple gateways, multiple access nodes and client devices, wherein one of the client devices is a broadcast listening device, and one of the client devices is a broadcast listening device, according to an embodiment.

FIG. 3 shows a wireless network that includes multiple gateways, multiple access nodes and client devices, wherein one of the client devices is a broadcast listening device, and one of the client devices is a broadcast listening device, according to an embodiment. A first gateway 380 and associated access node 323 form a first cluster, and second gateway 320 and associated access nodes 321, 322, 324, form a second cluster. This embodiment includes distribution of broadcast traffic through multiple gateways of the wireless mesh network.

As shown, a broadcast listening device 325 is connected to a broadcast listening access node 323, and the broadcast listening access node is connected to the first gateway 380. Further, a broadcast source device 327 is connected to a broadcast source access node 324 which is connected to access node 321, which is connected to the second gateway 320. Further, the first gateway 380 and the second gateway 320 are connected to an upstream network 110.

For an embodiment, the first gateway 380 obtains broadcast listening information of the broadcast listening access node 323, wherein the broadcast listening access node 323 is downstream from the first gateway 380. Further, the broadcast listening access node 323 is connected to the broadcast listening device 325 The broadcast listening information includes an identifier of the broadcast listening access node 323, and a broadcast identifier of the broadcast listening device 325.

For an embodiment, the first gateway 380 exchanges the broadcast listening information and the broadcast sourcing information with the second gateway 320 of the wireless mesh network.

For an embodiment, the second gateway 320 obtains broadcast sourcing information of the broadcast sourcing access node 324, wherein the broadcast sourcing access node 324 is downstream from the second gateway 320. The broadcast sourcing access node 324 is connected the broadcast sourcing device 327. The broadcast sourcing information includes an identifier of the broadcast sourcing access node 324, and a broadcast identifier the broadcast sourcing device 327.

For an embodiment, the second gateway 320 provides broadcast listening information of the broadcast listening access node to the broadcast sourcing access node upon determining the broadcast identifier of the broadcast sourcing device matches the broadcast identifier of the broadcast listening device.

For at least some embodiments, when the client devices (broadcast listening or broadcast source device) roams to a different AN, the old AN unregisters the client device to the cluster gateway and/or the cluster gateway ages-out the entry periodically. A new AN (a broadcast source AN, a broadcast listening AN, or both) then registers the client device to the new cluster gateway and this also includes updating the cluster gateway table of the new gateway accordingly. For at least some embodiments, when the AN (broadcast listening access node or broadcast source access node) itself roams to a different AN within the same cluster, there is no change in the cluster gateway table, and everything operates as is because the AN keeps its old IP address.

For a least some embodiments, when the client devices or the AN itself roams to a different AN or gateway in a different cluster gateway, the gateways exchange their broadcast tables. For at least some embodiments, this includes exchanging all the gateway IP addresses. Further, the prior gateway sends its broadcast table to other gateways periodically and/or when some entries of the broadcast table have changed.

Each gateway then includes listeners (broadcast listening access nodes) from other gateways when building its broadcast table. However, the broadcast source access nodes from other gateways may not be included in the table. When the gateway notifies its broadcast source access nodes of its cluster, the gateway includes broadcast listening access nodes from all other gateways that have the same broadcast-ID (matched) as the broadcast source access node.

When a client device (a listener) roams to a different gateway, the new gateway notifies the original (prior) gateway that has the broadcast source AN in its cluster by exchanging the broadcast table.

When a broadcast listening AN that has broadcast listening client devices attached to it roams to a different gateway, the broadcast listening AN maintains its same IPaddress even though the broadcast listening AN has roams to different gateway. In this case, there may be certain period where the AN IPaddress exists in more than one gateway tables. For an embodiment, each gateway removes the duplicate IPaddress when notifying the broadcast source access nodes.

FIG. 4 is a flow chart that includes steps of a method of distributing broadcast traffic through a wireless mesh network, according to an embodiment. A first step 410 includes obtaining, by a gateway of the wireless mesh network, broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device. For at least some embodiments, the gateway obtains the broadcast listening information through a notification received from the broadcast listening access node. A second step 420 includes obtaining, by the gateway, broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device. For an embodiment, the gateway obtains the broadcast sourcing information through a notification received from the broadcast sourcing access node. A third step 430 includes providing, by the gateway, broadcast listening information of the broadcast listening access node to the broadcast sourcing access node upon determining the broadcast identifier of the broadcast sourcing device matches the broadcast identifier of the broadcast listening device.

At least some embodiments further include the broadcast sourcing access node receiving broadcast packets from the broadcast sourcing device connected to the broadcast sourcing access node, and the broadcast sourcing access node encapsulating the broadcast packets into unicast packets, and unicast transmitting the unicast packets through the wireless mesh network to the broadcast listening access node, wherein the unicast packets include a destination IP address that is an IP address of the broadcast listening access node. For at least some embodiments, the unicast packets are unicast transmitted to an IP address of the broadcast listening access node. At least some embodiments further include the listening access node receiving the encapsulated packets, de-encapsulating the encapsulated packets, and transmitting the de-encapsulated packets to the broadcast listening device.

At least some embodiments further include the gateway exchanging the broadcast listening information with other gateways within the wireless mesh network. At least some embodiments further include the sourcing access node receiving broadcast packets from the broadcast sourcing device connected to the sourcing access node, and the sourcing access node encapsulating the broadcast packets into unicast packets, and unicast transmitting the unicast packets through a first gateway of a first cluster and a second gateway of a second cluster of the wireless mesh network to a broadcast listening access node of the second cluster after determining the broadcast identifier of the broadcast sourcing device matches a broadcast identifier of the broadcast listening device of the second cluster.

As previously described, for at least some embodiments, the gateways only exchange broadcast listening information. That is, for these embodiments the gateways do not exchange broadcast sourcing information. The gateway of a cluster only needs to know the sourcing access node from its cluster, it doesn't care about the sourcing access node from the other clusters since when doing the matching of the broadcast ID of the client devices, it matches the sourcing access node from its cluster against all listening access nodes from all clusters.

For at least some embodiments, an IP address of the listening access node is maintained when the listening access node roams to a different upstream device or a different cluster.

At least some embodiments further include the listening access node and the broadcast sourcing access node each selecting an upstream gateway based on a routing selection protocol. At least some embodiments further include the listening access node updating its selected upstream gateway with the broadcast listening information, and the broadcast sourcing access node updating its selected upstream gateway with the broadcast sourcing information. For at least some embodiments, the identifier of the broadcast listening access node includes an IP address of the broadcast listening access node. For at least some embodiments, the updating is periodic. For at least some embodiments, a roaming listening access node updates a more recently selected upstream device or upstream gateway with its broadcast listening information.

Figure 5:
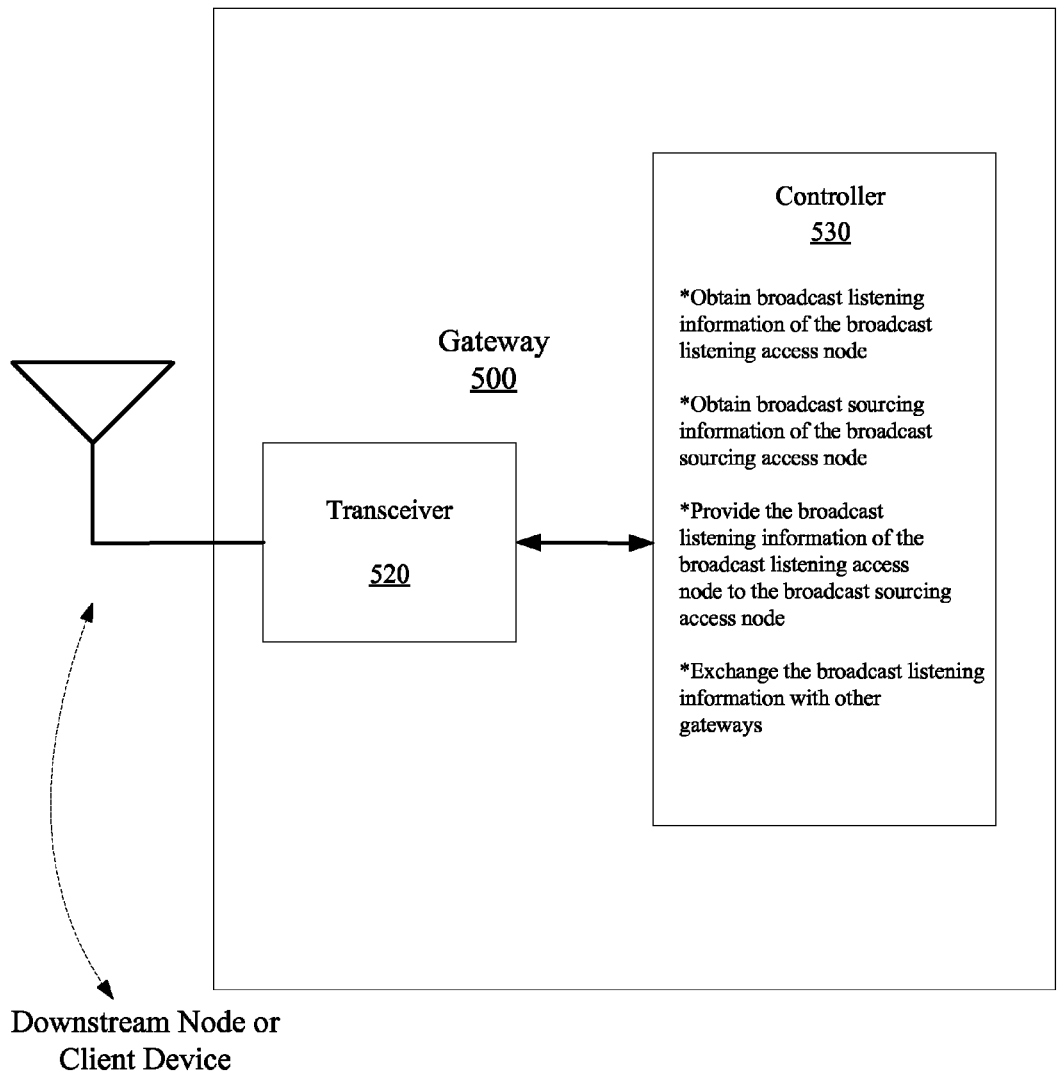
FIG. 5 show a gateway and corresponding processor operations, according to an embodiment.

FIG. 5 show a gateway and corresponding processor operations, according to an embodiment. The gateway 500 includes at least one transceiver 520 which the gateway uses for communicating with other devices, such as, downstream access nodes or client devices. Further, the gateway 500 includes a wired or wireless link to an upstream network.

The gateway 500 further includes a controller 530 or processor for controlling operation of the gateway 500. As described, for at least some embodiments, the controller 530 is operative to obtain broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device. The processor is further operative to obtain broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device. The processor is further operative to provide the broadcast listening information of the broadcast listening access node to the broadcast sourcing access node upon determining the broadcast identifier of the broadcast sourcing device matches the broadcast identifier of the broadcast listening device. Further, for at least some embodiments, the processor is operative to exchange the broadcast listening information with other gateways within the wireless mesh network.

Although specific embodiments have been described and illustrated, the embodiments are not to be limited to the specific forms or arrangements of parts so described and illustrated.

What is claimed:

1. A wireless mesh network gateway, comprising:
   one or more transceivers for communicating with other devices of a wireless mesh network;
   a processor, the processor operative to:
   obtain broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device;

obtain broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device;

provide the broadcast listening information of the broadcast listening access node to the broadcast sourcing access node upon determining the broadcast identifier of the broadcast sourcing device matches the broadcast identifier of the broadcast listening device; wherein the wireless mesh network gateway is a part of a first cluster; and wherein the sourcing access node receives broadcast packets from the broadcast sourcing device connected to the broadcast sourcing access node, and the broadcast sourcing access node encapsulates the broadcast packets into unicast packets, and unicast transmits the unicast packets through the wireless mesh network gateway of the first cluster and a second gateway of a second cluster of the mesh network to a broadcast listening access node of the second cluster after determining the broadcast identifier of the broadcast sourcing device matches a broadcast identifier of the broadcast listening device of the second cluster.

2. The gateway of claim 1, wherein the processor is further operative to exchange the broadcast listening information with other gateways within the wireless mesh network.

3. A method of supporting broadcast traffic through a mesh network, comprising:

obtaining, by a gateway of the mesh network, broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device;

obtaining, by the gateway, broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device;

providing, by the gateway, broadcast listening information of the broadcast listening access node to the broadcast sourcing access node upon determining the broadcast identifier of the broadcast sourcing device matches the broadcast identifier of the broadcast listening device; and receiving, by the sourcing access node, broadcast packets from the broadcast sourcing device connected to the broadcast sourcing access node, and the broadcast sourcing access node encapsulating the broadcast packets into unicast packets, and unicast transmitting the unicast packets through a first gateway of a first cluster and a second gateway of a second cluster of the mesh network to a broadcast listening access node of the second cluster after determining the broadcast identifier of the broadcast sourcing device matches a broadcast identifier of the broadcast listening device of the second cluster.

4. The method of claim 3, wherein the broadcast listening access node is additionally connected to other broadcast listening devices having different broadcast identifiers.

5. The method of claim 3, wherein the broadcast sourcing access node is additionally connected to other broadcast sourcing devices having different broadcast identifiers.

6. The method of claim 3, wherein an IP address of the listening access node is maintained when the listening access node roams to a different upstream device or a different cluster.

7. The method of claim 3, wherein the unicast packets are unicast transmitted to an IP address of the broadcast listening access node.

8. The method of claim 3, further comprising the listening access node receiving the encapsulated packets, de-encapsulating the encapsulated packets, and transmitting the de-encapsulated packets to the broadcast listening device.

9. The method of claim 3, further comprising the gateway exchanging the broadcast listening information with other gateways within the mesh network.

10. The method of claim 3, further comprising the listening access node and the broadcast sourcing access node each selecting an upstream gateway based on a routing selection protocol.

11. The method of claim 10, further comprising the listening access node updating its selected upstream gateway with the broadcast listening information, and the broadcast sourcing access node updating its selected upstream gateway with the broadcast sourcing information.

12. The method of claim 11, wherein the identifier of the broadcast listening access node includes an IP address of the broadcast listening access node and the identifier of the broadcast sourcing access node includes an IP address of the broadcast sourcing access node.

13. The method of claim 11, wherein the updating is periodic.

14. A method of supporting broadcast traffic through a mesh network, comprising:

obtaining, by a gateway of the mesh network, broadcast listening information of a broadcast listening access node, wherein the broadcast listening access node is downstream from the gateway, and the broadcast listening access node is connected to a broadcast listening device, and wherein the broadcast listening information includes an identifier of the broadcast listening access node, and a broadcast identifier of the broadcast listening device;

obtaining, by the gateway, broadcast sourcing information of a broadcast sourcing access node, wherein the broadcast sourcing access node is downstream from the gateway, and the broadcast sourcing access node is connected a broadcast sourcing device, and wherein the broadcast sourcing information includes an identifier of the broadcast sourcing access node, and a broadcast identifier of the broadcast sourcing device;

providing, by the gateway, broadcast listening information of the broadcast listening access node to the broadcast sourcing access node upon determining the broadcast identifier of the broadcast sourcing device matches the broadcast identifier of the broadcast listening device;

the listening access node and the broadcast sourcing access node each selecting an upstream gateway based on a routing selection protocol;

the listening access node updating its selected upstream gateway with the broadcast listening information, and the broadcast sourcing access node updating its selected upstream gateway with the broadcast sourcing information;

wherein a roaming listening access node updates a more recently selected upstream device or upstream gateway with its broadcast listening information.

15. A method of supporting broadcast traffic through a mesh network, comprising:

obtaining, by a first gateway of the mesh network, broadcast listening information of a broadcast listening access node, wherein the broadcast listening access node is downstream from the first gateway, and the broadcast listening access node is connected to a broadcast listening device, and wherein the broadcast listening information includes an identifier of the broadcast listening access node, and a broadcast identifier of the broadcast listening device;

the first gateway exchanging the broadcast listening information with a second gateway within the mesh network;

obtaining, by the second gateway, broadcast sourcing information of a broadcast sourcing access node, wherein the broadcast sourcing access node is downstream from the second gateway, and the broadcast sourcing access node is connected a broadcast sourcing device, and wherein the broadcast sourcing information includes an identifier of the broadcast sourcing access node, and a broadcast identifier the broadcast sourcing device;

providing, by the second gateway, broadcast listening information of the broadcast listening access node to the broadcast sourcing access node upon determining the broadcast identifier of the broadcast sourcing device matches the broadcast identifier of the broadcast listening device; and receiving, by the sourcing access node, broadcast packets from the broadcast sourcing device connected to the broadcast sourcing access node, and the broadcast sourcing access node encapsulating the broadcast packets into unicast packets, and unicast transmitting the unicast packets through a first gateway of a first cluster and a second gateway of a second cluster of the mesh network to a broadcast listening access node of the second cluster after determining the broadcast identifier of the broadcast sourcing device matches a broadcast identifier of the broadcast listening device of the second cluster.

* * * * *